United States Patent
Goad (10) Patent No.: US 7,382,313 B1
(45) Date of Patent: Jun. 3, 2008

(54) METHOD FOR ABSOLUTE CALIBRATION OF GLOBAL NAVIGATION SATELLITE SYSTEM ANTENNAS

(75) Inventor: Clyde C. Goad, Columbus, OH (US)

(73) Assignee: Topcon GPS, LLC, Paramus, NJ (US)

( * ) Notice: Subject to any disclaimer, the term of this patent is extended or adjusted under 35 U.S.C. 154(b) by 784 days.

(21) Appl. No.: 10/980,710

(22) Filed: Nov. 3, 2004

(51) Int. Cl.
G01S 5/14 (2006.01)

(52) U.S. Cl. .............................. 342/357.02; 342/357.08

(58) Field of Classification Search ................ None
See application file for complete search history.

(56) References Cited

U.S. PATENT DOCUMENTS

| | | | | |
|---|---|---|---|---|
| 5,777,578 | A * | 7/1998 | Chang et al. .......... | 342/357.06 |
| 6,023,240 | A * | 2/2000 | Sutton .................. | 342/357.11 |
| 6,304,210 | B1 * | 10/2001 | Allison et al. ......... | 342/357.08 |
| 6,633,256 | B2 * | 10/2003 | Zhdanov et al. ....... | 342/357.17 |

OTHER PUBLICATIONS

G. Wubbena, et al., "Automated Absolute Field Calibration of GPS Antennas in Real-Time", Proceedings of ION GPS Sep. 19-22, 2000, Salt Lake City, Utah, USA.
G. Seeber, et al., "Precise GPS Positioning Improvements by Reducing Antenna and Site Dependent Effects", IAG Symposium, vol. 118, Rio de Janeiro, Brazil, Sep. 3-9, 1997.
F. Menge, et al., "Results of Absolute Field Calibration of GPS Antenna PCV", Proceddings of ION GPS-98, Nashville, Tenn., USA, Sep. 15-18, 1998.
G. Wubbena, et al., "A New Approach for Field Calibration of Absolute Antenna Phase Center Variations", Proceedings of ION GPD-96, Kansas City, Missouri, 1996.
G. Mader, "GPS Antenna Calibration at the National Geodetic Survey", downloaded from http://www.ngs.noaa.gov/ANTCAL/Files/summary.html on Oct. 11, 2004.

* cited by examiner

Primary Examiner—Gregory C Issing
(74) Attorney, Agent, or Firm—Weinick & Associates, LLC (57) ABSTRACT

Disclosed is an antenna calibration technique for performing absolute antenna calibration. An antenna to be calibrated is positioned in a first position, called a home position, and records data samples from received satellite signals. The antenna is then moved to another location, called a non-home position, and records data samples from received satellite signals while at the non-home position. The antenna is then returned to the home position and records additional data samples. During the time that the antenna to be calibrated is recording its data samples, an auxiliary antenna is also recording satellite signal data samples. The data samples taken by the antenna to be calibrated during the home and non-home positions are differenced with the data samples taken by the auxiliary antenna during the same time period. The differenced data are interpolated to determine, at a particular time, an estimate of what the differenced data would be if the antenna to be calibrated occupied both the home and non-home positions at the same point in time. This allows for determination of the phase center of the antenna to be calibrated by differencing the interpolated estimates.

22 Claims, 4 Drawing Sheets

METHOD FOR ABSOLUTE CALIBRATION OF GLOBAL NAVIGATION SATELLITE SYSTEM ANTENNAS

BACKGROUND OF THE INVENTION

The present invention relates generally to antenna calibration, and more particularly to absolute calibration of global navigation satellite system antennas.

Global navigation satellite systems (GNSS), such as GPS (U.S.A.) and GLONASS (Russia), are well known in the art. A navigation receiver receives and processes radio signals transmitted by satellites located within line-of-sight distance of the receivers. The satellite signals comprise carrier signals that are modulated by pseudo-random binary codes. The receiver measures the time delay of the received signal relative to a local reference clock or oscillator. These measurements enable the receiver to determine the so-called pseudo-ranges between the receiver and the satellites. The pseudo-ranges are different from the ranges (distances) between the receiver and the satellites due to various noise sources and variations in the time scales of the satellites and receiver. If the number of satellites is large enough and satellite clock differences are known, then the measured pseudo-ranges can be processed to determine the user location and coordinate time scales. Some satellites broadcast more than one code-modulated carrier signal, such as a GPS satellite which broadcasts a carrier in the L1 frequency band and another carrier in the L2 frequency band. More than two frequency carriers are possible.

The requirement of determining user location with a high degree of precision, and the desire to improve the stability and reliability of measurements, have led to the development of differential navigation (DN). In differential navigation, the task of finding the user position, also called the Rover, is performed relative to a Base station (Base). The precise coordinates of the Base station are assumed known and the Base station is generally stationary during measurements. The Base station has a navigation receiver which receives and processes the signals of the satellites to generate measurements. These signal measurements are transmitted to the Rover via a communication channel (e.g., wireless). The Rover uses these measurements received from the Base, along with its own measurements taken with its own navigation receiver, in order to determine its location precisely.

The location determination accuracy of differential navigation may be further improved by supplementing the pseudo-range measurements with measurements of the phases of the satellite carrier signals. If the carrier phase of the signal received from a satellite in the Base receiver is measured and compared to the carrier phase of the same satellite measured in the Rover receiver, measurement accuracy may be obtained to within several percent of the carrier's wavelength.

The collection of GPS pseudorange (code) and phase (carrier) data at two or more sites simultaneously and subsequent processing to determine precise relative coordinates (baselines) is well known in the art. Using well-known techniques, code and phase data are usually processed in either one-way (no differencing), single-, double-, or triple-difference modes. It is well known that one-way, single- and double-differences of carrier phase measurements have biases that must be estimated. In particular, if successful, the integer nature of the double-difference biases (also called ambiguities) will be recognized and the solution may be constrained so that the integer nature of the double-difference ambiguities is preserved.

A GPS solution for a baseline provides the vector between the phase centers (or electrical centers) of the antennas at either end of the baseline. However, antennas do not have single well defined phase centers, but instead the location of an antenna phase center is a function of the direction from which the antenna receives a signal. In order to take full advantage of the millimeter level carrier phase measurements, these variations in antenna response, or range (distance) corrections, as a function of satellite azimuth and elevation must be modeled.

Initially, such models treated the antenna corrections as an offset to the range measurement to a theoretical phase center, whereby the phase center coordinates were given relative to a recognized physical antenna reference point known as the Antenna Reference Point (ARP).

Originally, antenna phase center calibrations were available only in relative form. It was recognized that two antennas of the same type, behaving (theoretically) identically to incoming signals because of their proximity to each other, would yield no information about the actual response to incoming voltage fronts. However, if the two antennas responded differently, e.g., using two different antenna designs, the differences in measured response could be determined. As such, original antenna phase center calibrations were calculated in terms relative to a given reference antenna. The United States Department of Commerce, National Oceanic and Atmospheric Administration (NOAA), National Geodetic Survey, has used this relative calibration technique to calibrate various types of antennas, using the Jet Propulsion Laboratory (JPL) Dorne/Margolin choke ring antenna type T (JPL D/M+crT) as the reference antenna. These calibrations do not provide absolute phase calibration for the tested antennas, but rather the relative calibrations with respect to this particular reference antenna.

While the above described technique utilizes relative calibration, the absolute nature of antenna response variations has also been studied. In particular, it has been recognized that if a short baseline with antennas of the same or different design are used, but one antenna is rotated with known rotation angles, the one being rotated responds in different ways depending on the angular orientation, and thus the absolute rather than relative responses can be estimated.

There are two types of absolute antenna calibration, one using antennas of the same type, and the other using antennas of different types. In order to determine absolute response using two of the same type antennas at different ends of a baseline, differences in response to different orientations from the different ends of the baseline can be used to model absolute response. Alternatively, if the antennas at each end of the baseline are of different types, then each would respond differently even without changing orientations. Thus, one of the antenna's absolute responses must be known so that the other antenna's responses at the opposite end of the baseline can be determined. Once a known antenna's response has been removed (measurements corrected or moved to the ARP), the unknown response of the other antenna can be recovered should sufficient samples be collected.

While the above described calibration techniques are useful, there are certain disadvantages. First, there is significant reliance on the consistency of antenna types. Using the relative calibration technique, consistency between various reference antennas (e.g., JPL D/M+crT) is required. Similarly, using the absolute calibration techniques with the same antenna type, the accuracy of the calibration relies on the fact that the two antennas of the same type will react in the same way. Given manufacturing variations, such reliance may result in inaccurate calibrations. Another disadvantage to both the relative and absolute methods is that the precise baseline between the reference and test antennas must be known so that variations can be determined from a study of measurement residuals after the known baseline contribution is removed. This requires that precise baseline measurements be made prior to antenna calibration.

What is needed is an antenna calibration technique which can accurately perform absolute antenna calibrations without reliance on a precisely known baseline, and without the need for precise advance information of the characteristics of the reference antenna.

BRIEF SUMMARY OF THE INVENTION

The present invention provides an improved antenna calibration technique for accurately performing absolute antenna calibrations.

In accordance with an embodiment of the invention, an antenna to be calibrated is positioned in a home position and records data samples from received satellite signals. The antenna is then moved to a non-home position (which may be any position other than the home position) and records data samples from received satellite signals. During the time that the antenna to be calibrated is recording its data samples, an auxiliary antenna is also recording satellite signal data samples. The data samples recorded by the antenna to be calibrated while in the home and non-home positions are differenced with the data samples taken by the auxiliary antenna during the same time period. The differenced data may then be used to determine a phase center of the antenna to be calibrated.

In one embodiment, the differenced data are interpolated to determine, at a particular time, an estimate of what the differenced data would be if the antenna to be calibrated occupied both the home and non-home positions at the same time. This allows for determination of the phase center of the antenna to be calibrated by differencing the interpolated estimates.

Various techniques are possible for positioning the antenna to be calibrated. In one advantageous embodiment, the antenna is placed in, and data are recorded at, a plurality of non-home positions, while periodically returning to the home position and recording data samples. By using an automated robot assembly, the antenna to be calibrated may be precisely moved between home and non-home positions.

One of the advantages of antenna calibration in accordance with the present invention is that there is no need to know the precise location of either the auxiliary antenna or the antenna to be calibrated prior to the calibration process. Neither is there a need to know a precise baseline between the auxiliary antenna and the antenna to be calibrated. The double differencing between interpolated home and interpolated non-home data sets completely eliminates the data collected at the auxiliary antenna.

These and other advantages of the invention will be apparent to those of ordinary skill in the art by reference to the following detailed description and the accompanying drawings.

DETAILED DESCRIPTION

Figure 1:
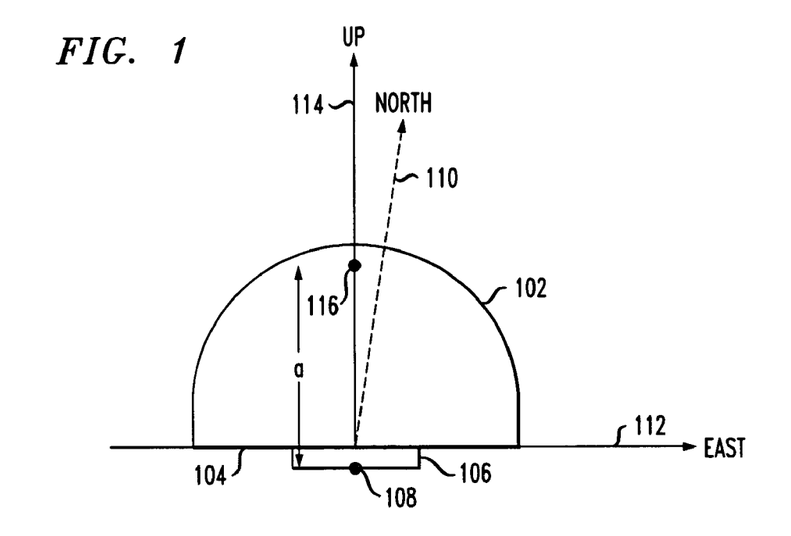
FIG. 1 shows a geometric diagram of a GPS antenna in a coordinate system.

FIG. 1 shows a geometric diagram of a GPS antenna in a coordinate system. The figure shows a cross section of an antenna having a half-sphere enclosure 102, a base 104, and a low noise amplifier (LNA) 106. This type of antenna is well known in the art of GPS antennas. The antenna reference point (ARP) 108 is a known physical point on the antenna, typically located at the base of the LNA 106 as shown in FIG. 1. It is conventional to express phase center location as a triad in terms of north, east, and up coordinates, with each of the coordinates expressed in mm. This coordinate system is shown in FIG. 1 with a north axis 110, an east axis 112, and an up axis 114. Consider now that the antenna has a phase center 116 located on the up axis which is coincident with the axis of symmetry of the antenna at a distance of a mm above the ARP 108. Assuming a satellite directly overhead, the voltage front from the satellite will activate the phase center 116. Thus, relative to the ARP 108, the antenna measurement of the distance to the satellite will be too short by a distance of a mm. Therefore, the distance a mm needs to be added to the measured distance to reflect what would have been measured if the point of activation had been located at the ARP 108. If the satellite is not directly overhead, then the correction to the measured distance on the up axis depends upon the elevation angle ($\theta$) of the satellite and the correction may be determined as: a $\sin(\theta)$. Typically, the up axis offset accounts for most of the phase center offset from the ARP 108. However, the phase center does not have to lie on the axis of symmetry, and in fact usually does not. Corrections for north, east and up coordinates may be calculated as:

Up: Sin(Elevation)

East: Sin(Azimuth) Cos(Elevation)

North: Cos(Azimuth) Cos(Elevation)

Figure 2:
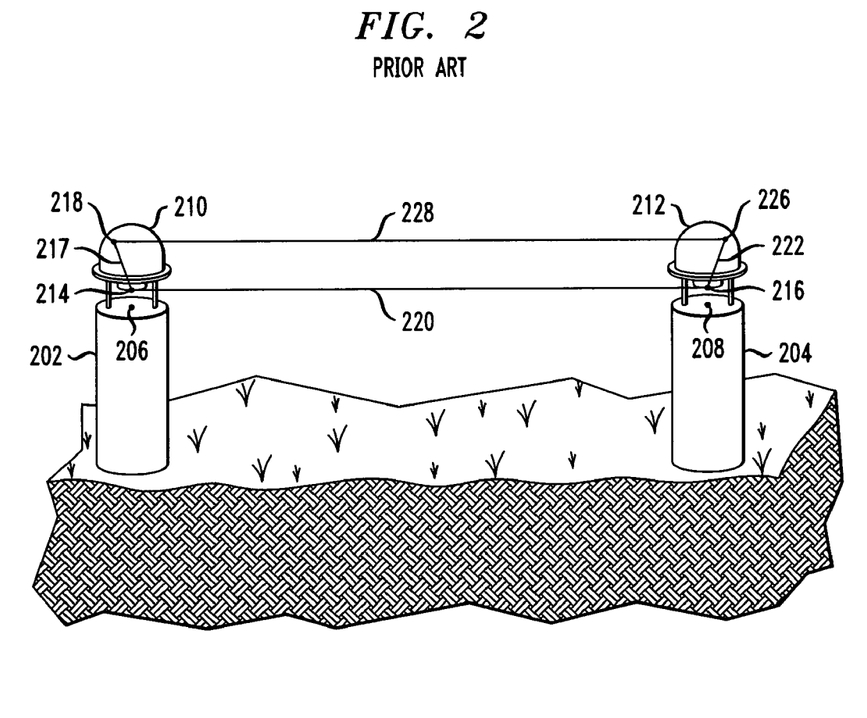
FIG. 2 shown a configuration of antennas which may be used for relative antenna calibration.

The first technique used for calibrating antennas was a relative antenna calibration, which will be described in conjunction with FIG. 2. Initially, absolute phase centers were not known, so all relative phase center calibrations were performed relative to the JPL D/M+crT antenna as the reference antenna. Using the (east, north, up) coordinate system, this reference antenna was assigned arbitrary phase center offsets of (0,0,110) and (0,0,128) for the L1 and L2 frequency bands respectively. FIG. 2 shows two piers 202, 204, each having a reference mark at a known location shown as 206 and 208 respectively. The known reference antenna 210 is mounted on pier 202 and the unknown test antenna 212 to be calibrated is mounted on pier 204. Each of the antennas would be connected to an appropriate GPS receiver in a well known manner. For clarity, such receivers are not shown in FIG. 2. Antenna 210 has an ARP 214, and antenna 212 has an ARP 216. The precise location of each ARP can be determined because each antenna is mounted in a known location relative to the known reference marks 206 and 208. Since antenna 210 is the reference antenna, the adopted offset 217 from the antenna's ARP 214 to its phase center 218 is known. Also known is the baseline vector 220 from ARP 214 of antenna 210 to ARP 216 of antenna 212. The unknown desired parameter is the offset 222 from the ARP 216 to the phase center 226 of test antenna 212.

Using well known differential GPS measurement techniques, the baseline vector for baseline 228 can be measured, where baseline 228 is the baseline from phase center 218 to phase center 226. If the antennas 210 and 212 were of the same type, then the vector for baseline 228 would be the same as the vector for baseline 220. However, since they are not the same, comparison of the two vectors using well known GPS techniques can provide the phase center 226 of antenna 212 in relative terms with respect to the phase center 218 of known antenna 210. Generally, multiple measurements are taken in order to make a fairly accurate determination of phase center 226.

As described above, the phase center of an antenna depends upon the location of the satellite transmitting the signals. Since the changing locations of the satellites are known based on transmitted ephemeris data, the changing phase centers may be determined by taking test measurements over the course of time. Using this technique, the changing satellite geometry relative to the antenna is a result of the movement of the satellite over time.

The above describe relative calibration technique is well known. The United States Department of Commerce, National Oceanic and Atmospheric Administration (NOAA), National Geodetic Survey, has used this relative calibration technique to calibrate various types of antennas, using JPL D/M+crT antenna as the reference antenna. These calibrations do not provide absolute phase center calibration for the tested antennas, but rather relative calibrations with respect to the particular reference antenna. The corrections, or phase center offsets, are presented in the above described north, east, up triad with respect to the antenna's ARP. However, the above described relative technique of watching change in geometry through changes in satellite location allows for only a small sampling of azimuthal and elevation values due to the satellite orbital motion relative to ground location. Because of the restricted set of samples, and due to the fact that most antennas are constructed with some degree of azimuthal symmetry, the relative tables generated by the National Geodetic Survey offer only phase center variations (PCVs) in terms of the elevation angles to the satellites.

Conventionally, the tabular information is presented so that the phase center offsets (PCOs) reflect fully the offsets for satellites directly overhead (elevation angle of 90 degrees). As such in the tabular values for the 90 degree elevation, PCVs are arbitrarily set to zero, and the normally smooth transitions for other elevation angles are given. Typically these values are given in increments of five degrees of elevation angle.

Antenna offset calculations using the relative tables utilize a PCO as a "phase center offset" and the rest of the offset is obtained through interpolation using a satellite elevation-only dependent table. This followed from a first realization of the need to adjust for antenna phase center, followed later by a realization that the adjustment for phase center did not adequately represent the total variation in measured range from the antenna used. Azimuthal contributions other than the PCOs were typically small and difficult to determine using relative techniques.

Since the difference between any two relative offsets is equal to the same difference of any two absolute offsets, absolute offsets of two antennas A and B can be generated from the relative offsets knowing only one of the antenna's absolute offset values as follows: ABS(A)=ABS(B)+(REL(A)−REL(B)).

Figure 3:
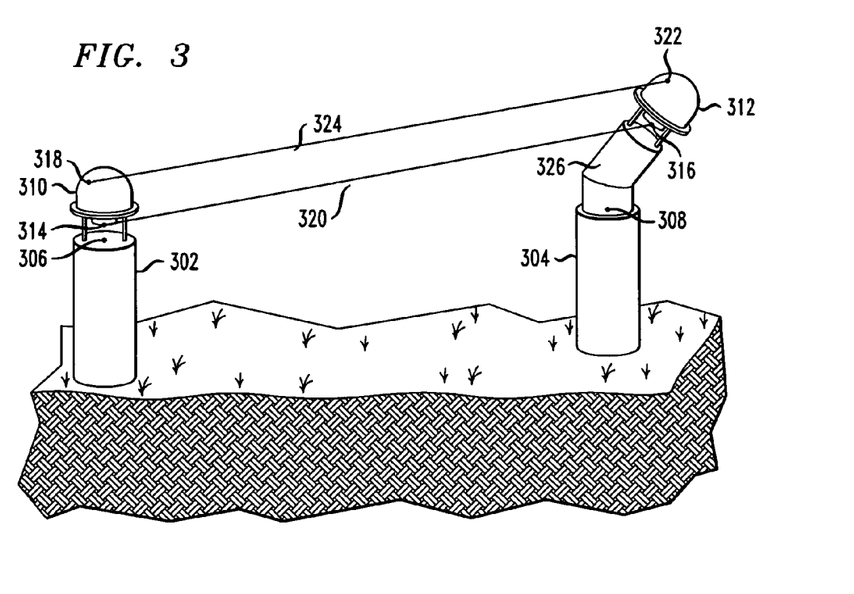
FIG. 3 shows a configuration of antennas which may be used for absolute antenna calibration.

As described above in the Background, absolute antenna calibration may be performed with either two antennas of the same type, or two antennas of different types. An exemplary configuration for absolute antenna calibration is shown in FIG. 3. FIG. 3 shows two piers 302, 304, each having a known reference mark shown as 306 and 308 respectively. The reference antenna 310 is mounted on pier 302 and the test antenna 312 to be calibrated is mounted on pier 304. Each of the antennas would be connected to an appropriate GPS receiver in a well known manner. For clarity, such receivers are not shown in FIG. 3. Antenna 310 has an ARP 314 and antenna 312 has an ARP 316. Unlike FIG. 2, test antenna 312 in FIG. 3 is mounted on a movement assembly 326 which allows for rotation about a chosen point (e.g., the ARP) of antenna 312. The movement assembly 326 is shown schematically in FIG. 3 and may be any type of device which allows for the movement of antenna 312. It may be a hand operated device or an automated robotic device. Since the reference point 308 is a known location, and the movement of the movement assembly 326 is controlled in a known manner, the vector from reference point 308 to ARP 316 may be determined for any location of antenna 312. The precise location of ARP 314 is known because antenna 310 is mounted in a known location relative to the known reference mark 306. Also known is the vector of baseline 320 from ARP 314 of antenna 310 to ARP 316 of antenna 312.

In the first case, where antennas 310 and 312 are the same, if both antennas have the same orientation, then the vector of baseline 320 should be the same as the vector of the baseline 324 from the phase center 318 of antenna 310 to the phase center 322 of antenna 312. However, if antenna 312 is rotated so that the antennas 310 and 312 have different orientations, the vector of baseline 320 will not be the same as the vector of baseline 324 because 1) as antenna 312 rotates about the chosen point, the phase center 322 will rotate as well (assuming that the phase center is not located on the axis of symmetry of antenna 312); and 2) the phase center of antenna 312 changes depending upon satellite elevation angle and azimuth, and as antenna 312 changes its orientation, the relative satellite elevation angle and azimuth changes. Thus, the same antenna at each end of the baseline allows for an expression of the difference on the baseline of each end's orientation. The impact on the baseline recovery can be expressed as a linear combination of the same antenna model for each end. That is, each end responds similarly to the same orientation and thus the impact can be modeled when the endpoint orientation is known. (Degree zero offset masks as a clock offset, and thus cannot be eliminated.)

In the case of different antenna types at each end of the baseline, in order to solve for one antenna response, the response of the other antenna must be known and must be removed in order to have measurements that are directly related to the response of the unknown antenna. Typically, if both ends of the baseline are held in fixed orientations (and parallel to each other) then relative values can be estimated. When one end is rotated, then this generates conditions that allow for determination of absolute responses.

As described above, the relative technique of watching change in geometry through changes in satellite location allows for only a small sampling of azimuthal and elevation values due to the satellite orbital motion relative to ground location. However, the advantageous use of an automated robot device, and the introduction of intentional changes in orientation of the antenna being calibrated, allows a much larger sampling of azimuths and elevations.

Figure 4:
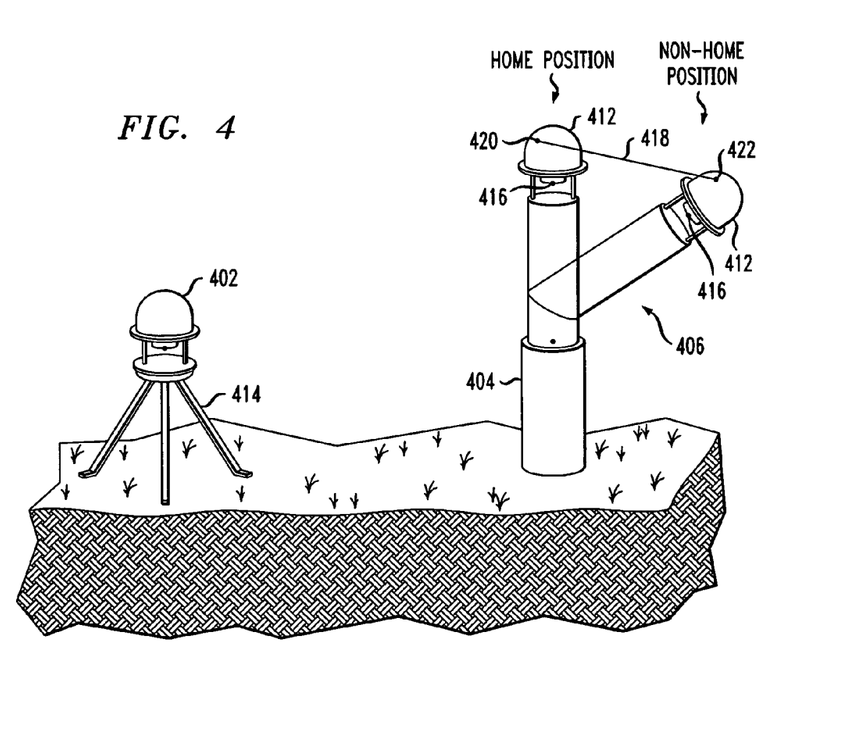
FIG. 4 shows a configuration of antennas that may be used in accordance with the principles of the present invention.

FIG. 4 shows a typical configuration of antennas that may be used in accordance with the principles of the present invention. A pier 404 is used to mount a automated robot assembly 406 (robot). A test antenna 412 to be calibrated is mounted on the robot 406. An auxiliary antenna 402 is mounted on a tripod 414, or other type of mounting device, with typically a short distance (e.g., approximately 10 meters) from pier 404. Advantageously, the robot 406 is a precise instrument which allows for the precise automated positioning of antenna 412 at known locations (e.g., the order of microns).

One position of antenna 412 will be denoted as the home position. As used herein, position includes both location and orientation, where location describes the three coordinates in space (e.g., x, y, z location) of the ARP 416, and orientation describes the rotation or three orientation angles (e.g., roll, pitch, yaw) of the antenna about the chosen point. In an advantageous embodiment, the home position is one in which the antenna is oriented in a typical upward orientation. The non-home positions are any positions other than the home position. The home position and one non-home position are shown in FIG. 4.

Figure 5:
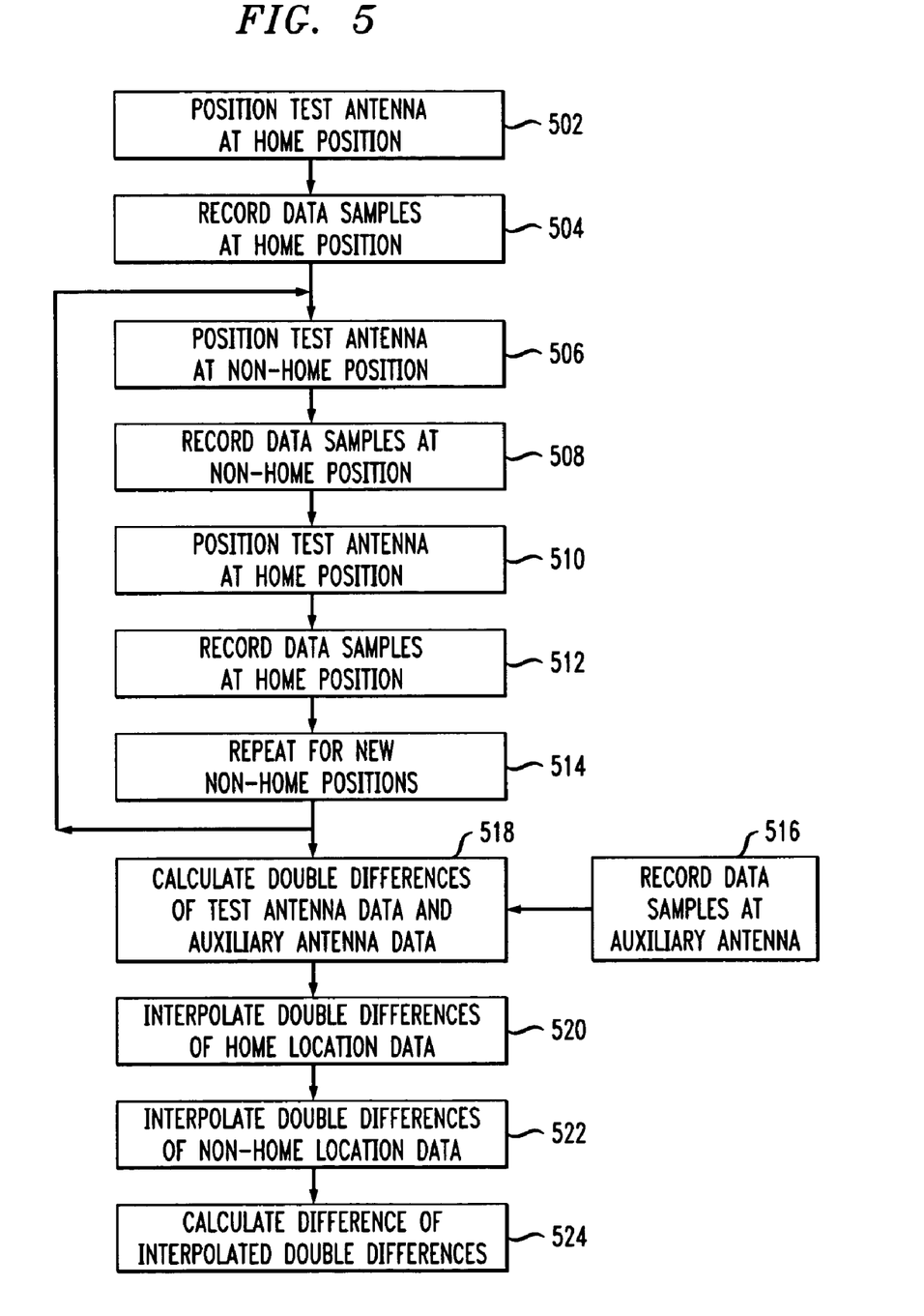
FIG. 5 shows a flowchart illustrating the steps to be performed in accordance with one embodiment of the invention.

In accordance with an embodiment of the invention, measurements are made and data samples are recorded by the antenna 412 at non-home positions, while periodically returning to the home position and taking measurements and recording data samples at the home position. A flowchart illustrating the steps to be performed in accordance with an embodiment of the invention is shown in FIG. 5. One skilled in the art will recognize that the steps shown in FIG. 5 may be implemented in various ways, including hardware, software, or a combination of hardware and software. In one particular embodiment, the steps may be performed by a computer processor executing computer program instructions stored on a computer readable medium.

First, in step 502, antenna 412 is positioned at the home position. Next, in step 504, measurements are taken at antenna 412 and data are recorded. Antenna 412 remains in the home position for some chosen amount of time (e.g., 5 or more epochs). In step 506, the test antenna 412 is moved to a non-home position and in step 508 measurements are taken and data are recorded. Again, antenna 412 remains in the non-home position for some chosen amount of time (e.g., 5 or more epochs). In step 510, the antenna 412 is returned to the home position and measurements are taken and data are recorded in step 512. As represented by step 514, steps 506 through 514 are then repeated for multiple non-home positions, with the antenna 412 periodically returning to the home position. It is noted that the steps shown in FIG. 5 describe the test antenna 412 taking measurements at the home position in-between measurements at each non-home location. However, one skilled in the art will understand from the description herein that the only requirement is that the test antenna 412 periodically return to the home position to take measurements. The particular measurement sequence may be varied.

While antenna 412 is taking these measurements, the auxiliary antenna 402 is also taking measurements, as represented by step 516. After some period of time the processing moves on to step 518 in which the measurements of antenna 412 and antenna 402 are differenced (using double-differencing). Double-differencing is well known, for example as described in *GPS for Geodesy*, Peter J G Teunissen, Alfred Kleusberg (Eds), Springer, 1998; and *Linear Algebra, Geodesy, and GPS*, Gilbert Strang and Kai Borre. Wellesley-Cambridge Press, 1997. Steps 506 through 514 may be repeated for any chosen amount of time, which will depend upon the desired degree of precision. It is noted that antenna calibration may only need to be performed once in order for a large number of users to gain the benefit of a calibrated antenna. This suggests that a relatively long calibration session is cost effective. For example a calibration session lasting 8-24 hours may be appropriate.

Figure 6:
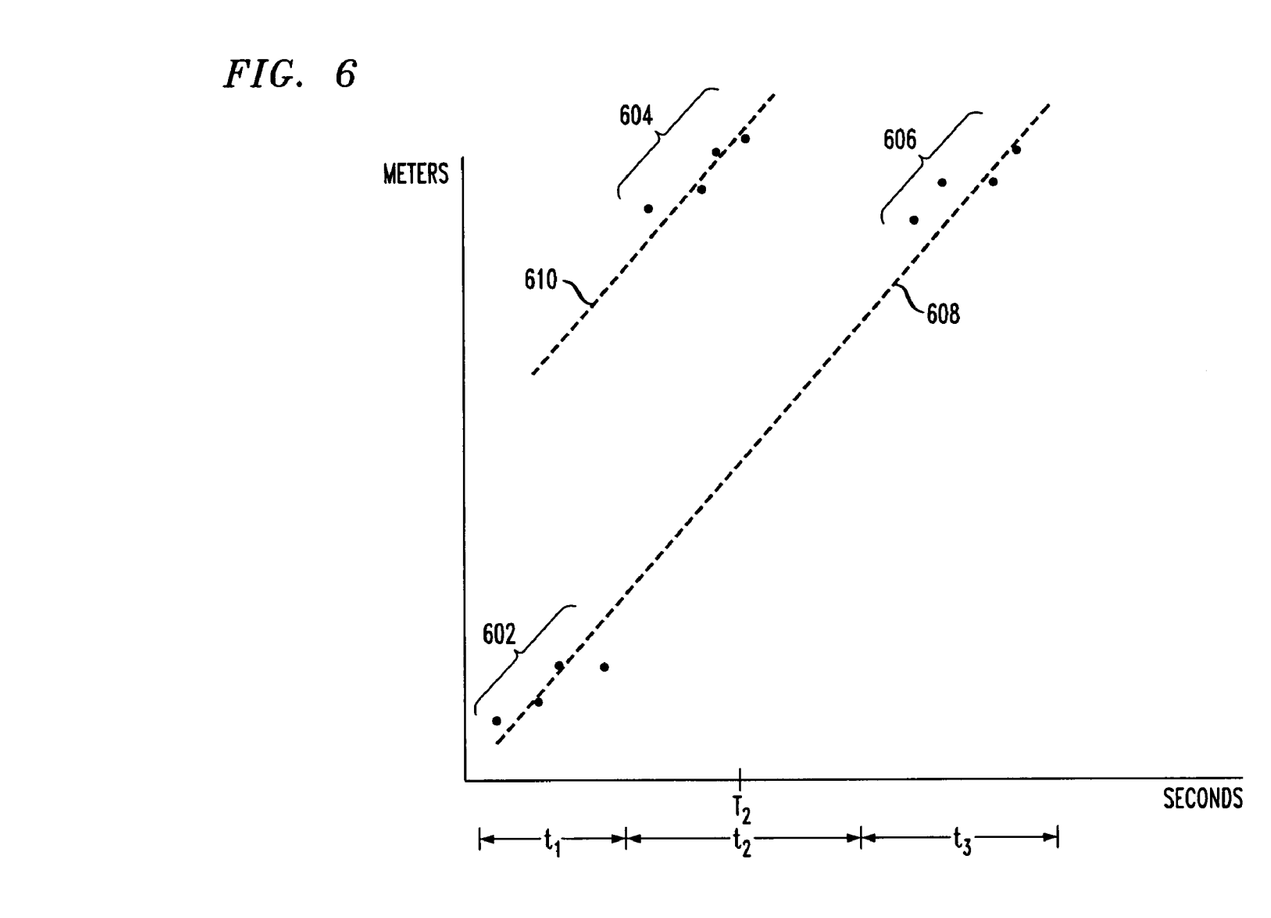
FIG. 6 shows an exemplary plot of double-difference phase data over a period of time.

An exemplary plot of double-difference phase data over a period of time is shown in FIG. 6. During time period $t_1$, antenna 412 is in the home position, and the double-differences corresponding to this time period are designated as 602. During time period $t_2$, antenna 412 is in a non-home position, and the double-differences corresponding to this time period are designated as 604. During time period $t_3$, antenna 412 is again in the home position, and the double-differences corresponding to this time period are designated as 606. The home position double-differenced data are then interpolated (step 520) to yield virtual measurements that would have been measured by the antenna 412 had it been at the home position during period $t_2$. This is illustrated in FIG. 6 by fitting a straight line 608 to the data points 602 and 606. Similarly, the data collected at the non-home positions are interpolated (step 522) as illustrated by fitting a straight line 610 to the data points 604.

The two lines 608 and 610 are differenced (step 524), and the resulting difference is an estimate of the double difference that would have been measured had antenna 412 occupied both the home and non-home positions at the same time. More particularly, line 610 is evaluated at a time $T_2$ (e.g., in the middle of interval $t_2$) and line 608 is evaluated at the same time $T_2$. These two evaluations are then differenced in order to estimate the double-difference that would have been measured had antenna 412 occupied both the home and non-home positions at time $T_2$. This allows calculation of the baseline 418 (FIG. 4) from the phase center 420 of antenna 412 while in the home position to phase center 422 of antenna 412 while in the non-home position using well known GPS data processing techniques. These data may then be analyzed using a technique of least squares to estimate the phase center offsets.

It is noted that the above described double differencing completely eliminates the data collected at the auxiliary antenna 402. The clock of the receiver (not shown) connected to the auxiliary antenna 402 and the clock of the receiver (not shown) connected to the test antenna 412 are removed from the data. Thus, the only contributor to the interpolation is the geometry of antenna 412. The main use of data from the auxiliary antenna 402 is to provide smoothly changing, easily interpolated double difference data.

An alternate technique is to evaluate the vector (baseline) from the auxiliary antenna to the home position and also evaluate (at a different time) the vector (baseline) from the auxiliary antenna to the non-home position. One can then subtract or difference the home vector from the non-home to yield the vector (baseline) from the home to the non-home position. There is an additional restriction for this alternative technique in that the satellites used for each vector (baseline) determination must be the same in order for all systematic errors to cancel. Should one vector have satellite data not present in the other, then the alignment of errors probably will not coincide and thus would not cancel. Thus the data interpolation procedure assures that full cancellation occurs for it would be impossible to interpolate using this alternative procedure should data not be present from both home and non-home occupations. Nevertheless, when all data match, a difference of baselines will yield the same information as does a data interpolation first, followed by a home to non-home baseline determination. Other variations are also possible, such as extending the baseline determination to multiple occupations. However, the principle is the same so long as the same positions and orientations are used.

It is noted that multipath is mostly a function of satellite geometry, and less a function of the changing geometry of the antenna (except for possibly reflected signals from the robot itself). Thus, by moving the antenna to different orientations one can expose the same "antenna based" geometries to different actual azimuths and elevations. That is for different physical azimuths and elevations, the use of the robot can repeat the apparent azimuths and elevations, as seen by the antenna. For example, it is known that very high elevation data are almost free of multipath. By rotating the antenna so that the antenna is oriented to high elevation satellites that relative to the antenna are low in its own coordinate system, the antenna then samples almost multipath-free data at very low apparent elevation orientations. Likewise, should the robot reflect signals itself, then by spreading around the different orientations, incoming signals will be exposed to a variety of reflective surfaces, thus minimizing the impact of a few harmful ones. Such harmful measurements can be rejected as outliers in the least-squares algorithm.

As can be recognized, antenna calibration in accordance with the present invention provides advantages over prior art techniques. First, antenna calibration in accordance with the present invention is achieved without knowledge of the auxiliary antenna type or its phase center characteristics. Further, there is no need to know the baseline vector between the auxiliary antenna and the test antenna being calibrated. Removing the requirement of a known baseline allows for easier setup of the auxiliary antenna, as illustrated in FIG. 4 where the auxiliary antenna 402 is mounted on a tripod 414 rather than a permanent pier.

As stated earlier, there are several representations for calculating phase offsets and variations. The only requirement is for the representation to be able to calculate the offset and variation value for any possible value of satellite azimuth and elevation, relative to the subject antenna. A simple table as a function of azimuth and elevation is quite adequate for this task. That is "a $\sin(\theta)$" can be used effectively displaying the needed values. Simple interpolation is generally used when tabular values use a grid size of the order of approximately 5 degrees. However, while easy to use, it is not as easy to determine directly from data. Here an analytical expression works better, and then after determination of the analytical expression parameters, the tabular representation can usually be easily generated.

For this analytical expression, simple polynomials can be used. Another well received expression is a Legendre function series that is analytical over the entire sphere, and in particular to the task at hand, it is analytical over the upper hemisphere.

Thus here we shall talk about a spherical Legendre surface series as follows:

$$R(\alpha, \theta) = \sum_{l=1}^{\infty} \sum_{m=0}^{l} P_{lm}(\sin\theta)[C_{lm}\cos(m\alpha) + S_{lm}\sin(m\alpha)]$$

The Legendre functions are well known in the art. The "l" value is referred to as the degree, and the "m" as the order. Others have used the maximum values of degree and order as 8 and 5, respectively, to give the reader an idea of the number of terms needed to explain adequately the variations in antenna response to incoming voltage fronts.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining a phase center of a first antenna comprising the steps of:
   recording a plurality of first satellite signal data samples while said first antenna is located at a first position;
   recording a plurality of second satellite signal data samples while said first antenna is located at a second position;
   calculating a plurality of first differences of said first satellite signal data samples and satellite signal data samples recorded at an auxiliary antenna;
   calculating a plurality of second differences of said second satellite signal data samples and satellite signal data samples recorded at said auxiliary antenna; and
   calculating said phase center of said first antenna based on said first and second differences.

2. The method of claim 1 wherein said step of calculating said phase center of said first antenna based on said first and second differences further comprises the steps of:
   interpolating said plurality of first differences;
   interpolating said plurality of second differences;
   differencing said interpolated first differences and said interpolated second differences to generate and estimated difference; and
   calculating said phase center based on said estimated difference.

3. The method of claim 1 wherein said antenna is oriented substantially upwards in said first position.

4. The method of claim 1 wherein said differences are double differences.

5. A method for determining a phase center of a first antenna comprising the steps of:
   positioning said first antenna at a first position and recording a first plurality of satellite signal data samples;
   positioning said first antenna at a second position and recording a second plurality of satellite signal data samples;
   returning said first antenna to said first position and recording a third plurality of satellite signal data samples;
   calculating difference data of satellite signal data samples recorded at an auxiliary antenna and said first and third plurality of satellite signal data samples to generate first position difference data;
   calculating difference data of satellite signal data samples recorded at said auxiliary antenna and said second plurality of satellite signal data samples to generate second position difference data; and calculating a phase center of said first antenna based on said first and second position difference data.

6. The method of claim 5 wherein said step of calculating a phase center of said first antenna based on said first and second position difference data further comprises the steps of:
interpolating said first position difference data; and
interpolating said second position difference data.

7. The method of claim 6 further comprising the step of:
differencing said interpolated first position difference data and said interpolated second position difference data.

8. The method of claim 5 wherein said antenna is oriented substantially upwards in said first position.

9. The method of claim 5 wherein said difference data is double difference data.

10. A method for determining a phase center of a first antenna comprising the steps of:
positioning said first antenna at a plurality of non-home positions and recording satellite signal data samples at each of said non-home positions;
periodically re-positioning said first antenna at a home position and recording satellite signal data samples at said home position;
calculating home position difference data of satellite signal data samples recorded at an auxiliary antenna and home position data samples to generate home position difference data;
calculating non-home position difference data of satellite signal data samples recorded at said auxiliary antenna and said non-home satellite signal data samples to generate non-home position difference data; and
calculating a phase center of said first antenna based on said home and non-home position difference data.

11. The method of claim 10 wherein said step of calculating a phase center of said first antenna based on said home and non-home position difference data further comprises the steps of:
interpolating said home position difference data; and
interpolating said non-home position difference data.

12. The method of claim 11 further comprising the step of:
differencing said interpolated home position difference data and said interpolated non-home position difference data.

13. The method of claim 10 wherein said antenna is oriented substantially upwards in said first position.

14. The method of claim 10 wherein said difference data is double difference data.

15. A computer readable medium comprising computer program instructions which, when executed by a processor, define steps for determining a phase center of a first antenna, said steps comprising:
recording a plurality of first satellite signal data samples while said first antenna is located at a first position;
recording a plurality of second satellite signal data samples while said first antenna is located at a second position;
calculating a plurality of first differences of said first satellite signal data samples and satellite signal data samples recorded at an auxiliary antenna;
calculating a plurality of second differences of said second satellite signal data samples and satellite signal data samples recorded at said auxiliary antenna; and
calculating said phase center of said first antenna based on said first and second differences.

16. The computer readable medium of claim 15 wherein said computer program instructions for calculating said phase center of said first antenna based on said first and second differences further comprises computer program instructions defining the steps of:
interpolating said plurality of first differences;
interpolating said plurality of second differences;
differencing said interpolated first differences and said interpolated second differences to generate and estimated difference; and
calculating said phase center based on said estimated difference.

17. The method of claim 15 wherein said differences are double differences.

18. An apparatus for determining a phase center of a first antenna comprising:
means for positioning said first antenna at a first position and recording a first plurality of satellite signal data samples;
means for positioning said first antenna at a second position and recording a second plurality of satellite signal data samples;
means for returning said first antenna to said first position and recording a third plurality of satellite signal data samples;
means for calculating difference data of satellite signal data samples recorded at an auxiliary antenna and said first and third plurality of satellite signal data samples to generate first position difference data;
means for calculating difference data of satellite signal data samples recorded at said auxiliary antenna and said second plurality of satellite signal data samples to generate second position difference data; and
means for calculating a phase center of said first antenna based on said first and second position difference data.

19. The apparatus of claim 18 wherein said means for calculating a phase center of said first antenna based on said first and second position difference data further comprises:
means for interpolating said first position difference data; and
means for interpolating said second position difference data.

20. The apparatus of claim 19 further comprising:
means for differencing said interpolated first position difference data and said interpolated second position difference data.

21. The apparatus of claim 18 wherein said antenna is oriented substantially upwards in said first position.

22. The method of claim 18 wherein said difference data is double difference data.

* * * * *